(12) United States Patent
Van Dam et al.

(10) Patent No.: US 9,988,875 B2
(45) Date of Patent: Jun. 5, 2018

(54) SYSTEM AND METHOD FOR CONTROLLING FLOW IN A WELL PRODUCTION SYSTEM

(71) Applicant: General Electric Company, Schenectady, NY (US)

(72) Inventors: Jeremy Daniel Van Dam, West Coxsackie, NY (US); Joseph John Zierer, Jr., Niskayuna, NY (US); Michael Franklin Hughes, Oklahoma City, OK (US); Zhipeng Zhang, Santa Clara, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 445 days.

(21) Appl. No.: 14/574,717

(22) Filed: Dec. 18, 2014

(65) Prior Publication Data

US 2016/0177666 A1 Jun. 23, 2016

(51) Int. Cl.
*E21B 43/12* (2006.01)
*E21B 34/08* (2006.01)
(Continued)

(52) U.S. Cl.
CPC ............ *E21B 34/08* (2013.01); *E21B 43/121* (2013.01); *E21B 43/32* (2013.01); *F16K 33/00* (2013.01)

(58) Field of Classification Search
CPC .......... E21B 43/12; E21B 34/08; E21B 43/14; E21B 33/124; E21B 43/32
See application file for complete search history.

(56) References Cited

U.S. PATENT DOCUMENTS

| 3,408,949 A | 11/1968 | Hart, Jr. |
| 3,410,217 A | 11/1968 | Kelley et al. |
(Continued)

FOREIGN PATENT DOCUMENTS

| EP | 2383430 A2 | 11/2011 |
| GB | 2447542 | 9/2008 |
(Continued)

OTHER PUBLICATIONS

International Search Report and Written Opinion issued in connection with corresponding Application No. PCT/US2015/064414 dated Nov. 9, 2016.
(Continued)

*Primary Examiner* — Kipp C Wallace
(74) *Attorney, Agent, or Firm* — GE Global Patent Operation; Pabitra K. Chakrabarti

(57) ABSTRACT

A flow control system is provided for a horizontal well production system having a casing, a tube having an intake opening and disposed within the casing, and a gap formed between the casing and the tube. The flow control system includes a valve having an orifice, coupled to the tube and disposed proximate to the intake opening. The flow control system further includes an actuator coupled to the valve and configured to open the valve in response to a presence of a liquid in the gap, proximate to the intake opening, to permit flow of the liquid into the tube via the intake opening, and to close the valve in response to a presence of a gas in the gap, proximate to the intake opening, to prevent flow of the gas into the tube via the intake opening.

21 Claims, 3 Drawing Sheets

(51) Int. Cl.
  *E21B 43/32* (2006.01)
  *F16K 33/00* (2006.01)

(56) References Cited

U.S. PATENT DOCUMENTS

| | | | | |
|---|---|---|---|---|
| 3,897,822 A * | 8/1975 | Mott | ............... | E21B 33/122 |
| | | | | 166/189 |
| 4,364,232 A | 12/1982 | Sheinbaum | | |
| 5,154,588 A | 10/1992 | Freet et al. | | |
| 5,271,725 A | 12/1993 | Freet et al. | | |
| 5,732,776 A * | 3/1998 | Tubel | ............... | E21B 34/066 |
| | | | | 166/250.15 |
| 6,135,210 A | 10/2000 | Rivas | | |
| 6,622,794 B2 * | 9/2003 | Zisk, Jr. | ............... | E21B 34/066 |
| | | | | 166/205 |
| 7,819,196 B2 * | 10/2010 | Aakre | ............... | E21B 34/08 |
| | | | | 166/320 |
| 8,316,942 B2 | 11/2012 | Brown et al. | | |
| 2002/0153141 A1 | 10/2002 | Hartman et al. | | |
| 2002/0189815 A1 | 12/2002 | Johnson et al. | | |
| 2006/0113089 A1 * | 6/2006 | Henriksen | ............... | E21B 34/08 |
| | | | | 166/386 |
| 2006/0249291 A1 * | 11/2006 | MacDougall | ............... | E21B 43/12 |
| | | | | 166/373 |
| 2009/0101329 A1 | 4/2009 | Clem et al. | | |
| 2009/0151925 A1 * | 6/2009 | Richards | ............... | E21B 34/06 |
| | | | | 166/53 |
| 2009/0159337 A1 * | 6/2009 | Alberty | ............... | E21B 47/10 |
| | | | | 175/48 |
| 2009/0236102 A1 | 9/2009 | Guest et al. | | |
| 2012/0305243 A1 * | 12/2012 | Hallundbæk | ............... | E21B 43/12 |
| | | | | 166/255.1 |
| 2013/0098629 A1 | 4/2013 | Wilson | | |
| 2014/0338922 A1 * | 11/2014 | Lopez | ............... | E21B 43/12 |
| | | | | 166/373 |
| 2015/0053420 A1 * | 2/2015 | Fripp | ............... | E21B 43/24 |
| | | | | 166/373 |
| 2015/0136414 A1 | 5/2015 | Hughes et al. | | |
| 2015/0167652 A1 | 6/2015 | Van Dam et al. | | |
| 2015/0354351 A1 * | 12/2015 | Morrow | ............... | E21B 47/01 |
| | | | | 367/82 |
| 2016/0258290 A1 * | 9/2016 | Murphree | ............... | E21B 43/12 |

FOREIGN PATENT DOCUMENTS

| | | |
|---|---|---|
| WO | 2006015277 A1 | 2/2006 |
| WO | 2013086616 A1 | 6/2013 |
| WO | 2013086623 A1 | 6/2013 |

OTHER PUBLICATIONS

Cooper et al., "An Overview of Horizontal Well Completion Technology", Society of Petroleum Engineers, SPE 17582, One Petro, Nov. 1-4, 1988, pp. 335-350.

* cited by examiner

SYSTEM AND METHOD FOR CONTROLLING FLOW IN A WELL PRODUCTION SYSTEM

BACKGROUND

The invention relates generally to oil wells and, more specifically, to a system and method for controlling flow in a horizontal well production system.

Generally, pumping systems are used in a wide variety of environments, including wellbore applications for pumping production fluids, such as water or petroleum. The pumping systems typically include, among other components, a pump positioned at a sufficient depth such that fluids can be lifted to a surface without reliance on reservoir pressure alone. The function of the pump is to reduce a bottom hole pressure and increase a rate of production. The pump may be an electric submersible pump, a rod pump, a progressing cavity pump, or the like. Many of such wells deviate from a straight path in order to enter production zones and follow geological formations that are often within a narrow band. Further, these directionally drilled wells often extend vertically down to reach the depth of the production formation and then extend horizontally along the formation for production of natural gas and oil.

In such a well configuration, all produced liquids and gases must flow along a substantially horizontal portion of the well to reach a single pump intake location. When the produced liquids block the free flow of gas by filling the entire wellbore and forming a trap, the gas pressure builds up until the gas escapes past the trap and flows along a downstream direction of the well. The gas that escapes past the liquid blockage is often referred to as a "gas slug", and is known to interfere with the operation of the pump, resulting in reduced production and damage to the pump. The increased wellbore pressure caused by buildup of the gas pressure results in further reduction in production flow rates. For a pumping system that includes a single intake passage, all production fluids migrate along the wellbore to reach the pump so that the production fluids can be lifted to the surface. Since most horizontal wells have many individual production zones distributed along the length of the well, production zones located closest to the pump intake, deliver fluids with less resistance to the pump. Production zones further away from the pump intake deliver fluids less effectively because of increased flow resistance between the production zone and the pump. Such drawbacks reduce the production rate and the total recovery of resources from the well.

There is a desire for a system and method for controlling flow in a well that allows increased production rates and total recovery.

BRIEF DESCRIPTION

In accordance with one exemplary embodiment, a flow control system for a horizontal well production system having a casing, a tube having an intake opening and disposed within the casing, and a gap formed between the casing and the tube, is disclosed. The flow control system includes a valve having an orifice, coupled to the tube and disposed proximate to the intake opening. The flow control system further includes an actuator coupled to the valve and configured to open the valve in response to a presence of a liquid in the gap, proximate to the intake opening, to permit flow of the liquid into the tube via the intake opening, and to close the valve in response to a presence of a gas in the gap, proximate to the intake opening, to prevent flow of the gas into the tube via the intake opening.

In accordance with another exemplary embodiment, a horizontal well production system is disclosed. The horizontal well production system includes a tube having an intake opening and disposed within a casing, a gap formed between the casing and the tube, and a pump coupled to the tube. The horizontal well production system further includes a flow control system. The flow control system includes a valve having an orifice, coupled to the tube and disposed proximate to the intake opening. The flow control system further includes an actuator coupled to the valve and configured to open the valve in response to a presence of a liquid in the gap, proximate to the intake opening, to permit flow of the liquid into the tube via the intake opening, and to close the valve in response to a presence of a gas in the gap, proximate to the intake opening, to prevent flow of the gas into the tube via the intake opening.

In accordance with another exemplary embodiment, a method for controlling flow in a horizontal well production system is disclosed. The method involves directing a gas and a liquid via a gap formed between a casing and a tube disposed within the casing. The method further involves opening a valve comprising an orifice, coupled to the tube and disposed proximate to an intake opening formed in the tube, via an actuator, in response to the presence of the liquid in the gap, proximate to the intake opening, to permit flow of the liquid into the tube via the intake opening. The method also involves directing the flow of the liquid via the tube to a horizontal well surface, using a pump. The method further involves closing the valve via the actuator in response to a presence of the gas in the gap, proximate to the intake opening, to prevent flow of the gas into the tube via the intake opening and directing the flow of the gas via the gap to the horizontal well surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with certain embodiments of the present invention, a flow control system for a horizontal well production system is disclosed. The flow control system includes a valve having an orifice, coupled to a tube and disposed proximate to an intake opening of the tube. The orifice may be a fixed orifice or a variable orifice. The tube is disposed within a casing of the horizontal well production system and a gap is formed between the tube and the casing. The flow control system includes an actuator coupled to the valve and configured to open the valve in response to the presence of a liquid in the gap, proximate to the intake opening, to permit flow of the liquid into the tube via the intake opening, and to close the valve in response to presence of a gas in the gap, proximate to the intake opening, to prevent flow of the gas into the tube via the intake opening. In accordance with certain other embodiments, a horizontal well production system having an exemplary flow control system is disclosed. In accordance with another embodiment, a method for controlling flow in a horizontal well production system is disclosed. The method involves directing a gas and a liquid via a gap formed between a casing and a tube disposed within the casing. The method further involves opening a valve having an orifice, coupled to the tube and disposed proximate to an intake opening formed in the tube, via an actuator, in response to the presence of the liquid in the gap, proximate to the intake opening, to permit flow of the liquid into the tube via the intake opening and then directing the flow of the liquid via the tube, using a pump. The method further involves closing the valve via the actuator in response to the presence of the gas in the gap, proximate to the intake opening, to prevent flow of the gas into the tube via the intake opening; and then directing the flow of the gas via the gap.

Figure 1:
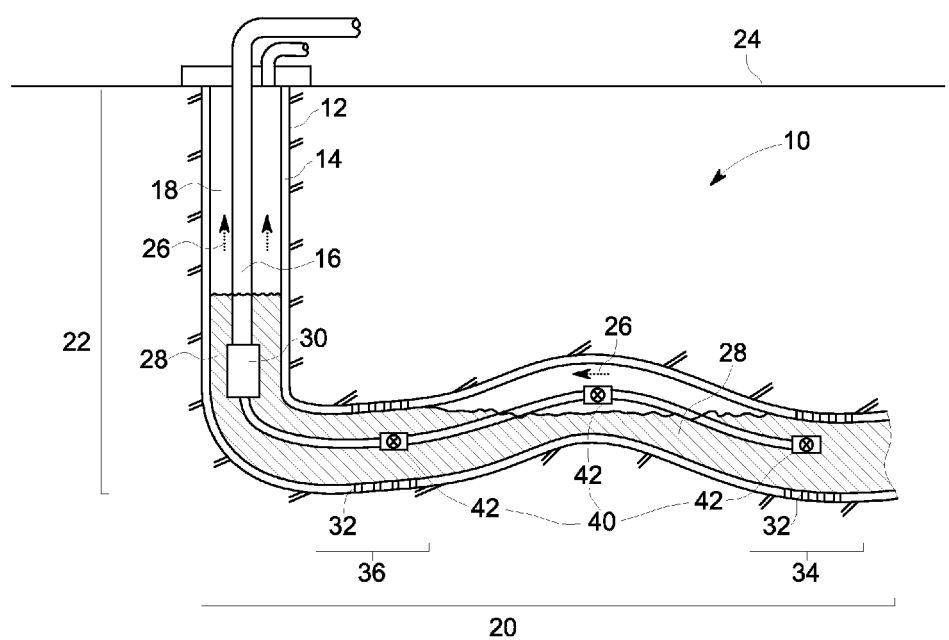
FIG. 1 is a schematic view of a horizontal well production system for producing hydrocarbons from a subsurface formation in accordance with an exemplary embodiment.

Referring to FIG. 1, a schematic view of a horizontal well production system 10 for producing hydrocarbons from a subsurface formation is shown in accordance with an exemplary embodiment. The horizontal well production system 10 includes an outer casing 12 and a well bore 14 formed within the outer casing 12. A tube 16 is disposed within the well bore 14. An annular gap 18 is formed between the outer casing 12 and the well bore 14. The horizontal well 10 production system has a substantially horizontal portion 20 and a substantially vertical portion 22 that extends downward from a surface 24 to the horizontal portion 20.

A gas 26 flows primarily through the annulus gap 18 towards the well surface 24. The tube 16 is used for conveying a liquid 28 towards the well surface 24. The liquid 28 may include one or more of a mixture of hydrocarbons, as well as water having contaminates such as, for example, chlorides, asphaltenes, parrafins, and solid particulates.

A pump 30 is coupled to the tube 16. The pump 30 is used to transfer the liquid 28 through the tube 16. During operation, the tube 16 channels the liquid 28 and the pump 30 directs the liquid 28 to the well surface 24. The pump 30 includes, but is not limited to, electric submersible pumps, positive displacement pumps, centrifugal pumps, jet pumps, rod driven progressive cavity pumps, jet pumps, hydraulic pumps, reciprocating pumps, and other devices that add energy to a fluid to cause fluid movement.

In the illustrated embodiment, a plurality of perforations 32 are formed in the outer casing 12 and the well bore 14, for permitting flow of the gas 26 and the liquid 28 from a plurality of production zones 34, 36. The number of production zones may vary depending upon the application. The tube 16 includes a plurality of intake openings 38 (shown in FIG. 2) provided with a flow control system 40 having a plurality of valves 42. Each valve 42 is coupled to the tube 16 and disposed proximate to the corresponding intake opening 38. Each valve 42 is opened in response to presence of the liquid 28 in the gap 18, proximate to the corresponding intake opening 38, to permit flow of the liquid 28 into the tube 16 via the corresponding intake opening 38. Further, each valve 42 is closed in response to presence of the gas 26 in the gap 18, proximate to the corresponding intake opening 38, to prevent flow of the gas 26 into the tube 16 via the corresponding intake opening 38. The selective opening and closing of the valves 42 facilitates the intake of the liquid 28 through the plurality of openings 38 along the horizontal well production system 10, and facilitates the transport of the liquid 28 through the tube 16. The gas 26 is transported through the gap 18 between the outer casing 12 and the well bore 14. The valve 42 and a valve actuation mechanism are described in greater detail with reference to subsequent figures.

It should be understood that the FIG. 1 arrangement is merely one embodiment of the present invention. Other embodiments may omit certain elements or include additional features. In certain embodiments, the pump 30 may be continuously operated to control reservoir pressure whereas in other arrangements the pump 30 may be operated only when needed to achieve a desired production flow rate or reservoir pressure.

Figure 2:
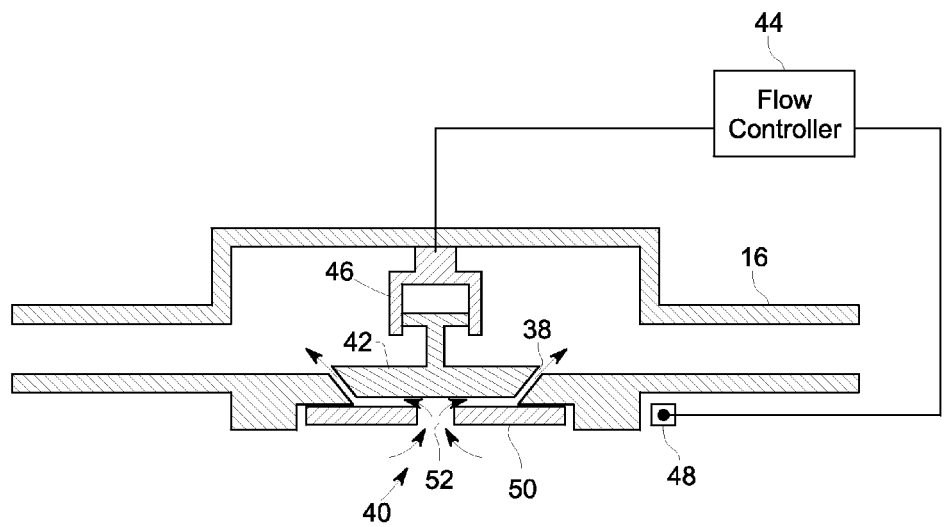
FIG. 2 is a schematic representation of a tube provided with a flow control system in accordance with an exemplary embodiment.

Referring to FIG. 2, a schematic representation of the tube 16 provided with the flow control system 40 is shown in accordance with an exemplary embodiment. In the illustrated embodiment, only one valve 42 is shown. As discussed previously, the valve 42 is coupled to the tube 16 and disposed proximate to the corresponding intake opening 38. In the illustrated embodiment, the valve 42 is a poppet valve. A flow controller 44 is coupled to the valve 42 via an actuator 46. Further, the flow controller is coupled to a gas sensor 48. The flow controller 44 is configured to control the actuator 46 based on an output of the gas sensor 48. The gas sensor 48 is disposed proximate to the intake opening 38 and configured to detect the presence of the gas proximate to the corresponding intake opening 38.

In the illustrated embodiment, a fixed orifice plate 50 is provided between the intake opening 38 and an internal passageway of the tube 16. A size of an orifice 52 of the fixed orifice plate 50 can be selected according to the distance of the valve 42 from an intake end of the pump, to achieve the desired flow resistance between each of the plurality of valves 42 and the intake end of the pump. A preferred embodiment is to use a smaller orifice that is closer to the pump and a larger orifice that is farther from the pump in order to ensure that the flow resistance from each valve 42 to the pump is substantially uniform. This arrangement will allow substantially uniform production from multiple production zones along the wellbore.

The actuator 46 is configured to close the valve 42 in response to detection of the presence of the gas in the gap, proximate to the corresponding intake opening 38, by the gas sensor 48. In other words, the actuator 46 is configured to close the valve 42 in response to presence of the gas in the gap, proximate to the corresponding intake opening 38, to prevent flow of the gas into the tube 16 via the corresponding intake opening 38. Further, the actuator 46 is configured to open the valve 42 in response to detection of the absence of the gas in the gap, proximate to the corresponding intake opening 38, by the gas sensor 48. In other words, the actuator 46 is configured to open the valve 42 in response to presence of the liquid in the gap, proximate to the corresponding intake opening 38, to permit flow of the liquid into the tube 16 via the corresponding intake opening 38.

As mentioned above, the flow control system 40 may include a plurality of gas sensors 48, each gas sensor 48 disposed proximate to each corresponding intake opening 38. Similarly, the flow control system 40 may include a plurality of actuators 46, each actuator 46 coupled to a corresponding valve 42. In other embodiments, the type of valve and actuator may vary depending on the application. In another embodiment, the valve may be a gate valve.

Individual flow controllers 44 may be located proximate to each individual valve 42. Alternatively, a single flow controller 44 may be located in a central location with signal communication to each of the plurality of valves 42. The location may be on the surface or within the wellbore.

In accordance with the embodiments of the present invention, the selective opening and closing of the valves 42 allows liquid to be extracted from a plurality of locations along the horizontal well where otherwise, the liquid would collect and trap pockets of the gas. The efficient removal of the liquid ensures that the tube 16 does not pick up pockets of the free gas. In an event that a gas slug is developed at one location of the well and migrates along the horizontal well, the selective closing of the valves 42 prevents the gas slug from entering the tube 16. The exemplary actuator 46 facilitates providing a greater force to actuate the valve 42, compared to limited forces generated from using other types of actuators such as a buoyant float.

Figure 3:
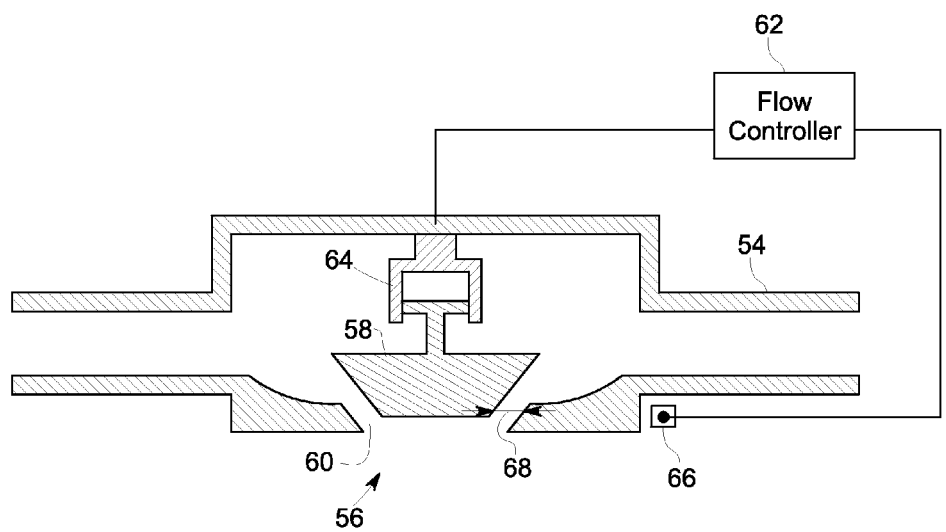
FIG. 3 is a schematic representation of a tube provided with a flow control system in accordance with another exemplary embodiment.

Referring to FIG. 3, a schematic representation of a tube 54 provided with a flow control system 56 is shown in accordance with another exemplary embodiment. In the illustrated embodiment, only one valve 58 is shown. The valve 58 is coupled to the tube 54 and disposed proximate to a corresponding intake opening 60. In the illustrated embodiment, the valve 58 is a poppet valve. A flow controller 62 is coupled to the valve 58 via an actuator 64. Further, the flow controller 62 is coupled to a gas sensor 66. The flow controller 62 is configured to control the actuator 64 based on an output of the gas sensor 66. The gas sensor 66 is disposed proximate to the intake opening 60 and configured to detect the presence of the gas proximate to the corresponding intake opening 60.

The valve 58 has a variable orifice 68 configured to control a flow rate of a liquid into the tube 54 via the intake opening 60. In the illustrated embodiment, the actuator 64 can be controlled to actuate the valve 58 to a particular open position. Specifically, movement of the valve 58 is controlled to adjust the flow area of the orifice 68. Similarly, the position of each valve from the plurality of valves 58 may be controlled. Hence, the flow of the liquid entering each valve can be modulated.

The variable orifice 68 of each valve 58 is controlled such that the pressure drop from a pump to each valve 58 results in a uniform total flow restriction. Specifically, the variable orifices 68 of the valves 58 closest to the pump are controlled to form smaller orifices to provide more flow restriction; and the variable orifices 68 of the valves 58 farthest from the pump are controlled to form larger orifices to provide less flow restriction. Such a control technique helps to maintain the same pressure drop from the pump to each valve 58. Further, the control technique helps to avoid the so-called "short-cycle" problem, where otherwise the majority of liquid would be drawn in through the intake openings 60 (path of least resistance) proximate to the pump.

Figure 4:
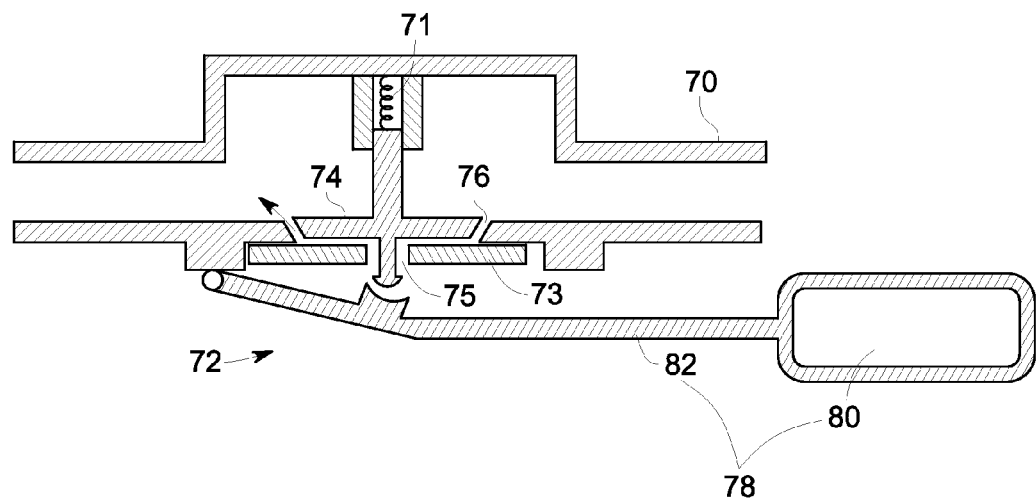
FIG. 4 is a schematic representation of a tube provided with a flow control system in accordance with yet another exemplary embodiment.

Referring to FIG. 4, a schematic representation of a tube 70 provided with a flow control system 72 in accordance with another exemplary embodiment is shown. In the illustrated embodiment, only one valve 74 is shown. Similar to the previous embodiment, the valve 74 is coupled to the tube 70 via a spring 71 and disposed proximate to an intake opening 76 formed in the tube 70. The valve 74 has an orifice plate 73 having a variable orifice 75 configured to control a flow rate of a liquid into the tube 70 via the intake opening 76. An actuator 78 is provided to actuate the valve 74. The actuator 78 includes a float 80 and a link 82 pivotably coupled to the tube 70.

The float 80 holds the valve 74 in an open position in response to presence of a liquid proximate to the intake opening 76. In other words, the actuator 78 is configured to close the valve 74 in response to presence of the gas in the gap, proximate to the corresponding intake opening 76, to prevent flow of the gas into the tube 70 via the corresponding intake opening 76. The float 80 holds the valve 74 in a closed position in response to presence of a gas proximate to the intake opening 76. In other words, the actuator 78 is configured to open the valve 74 in response to presence of the liquid in the gap, proximate to the corresponding intake opening 76, to permit flow of the liquid into the tube 70 via the corresponding intake opening 76. The flow control system 72 may include a plurality of actuators 78, each actuator 78 provided to a corresponding valve 74.

In accordance with the illustrated embodiment of the present invention, the liquid is selectively drawn from a plurality of intake openings 76 along a horizontal well, and transported through the tube 70. The flow control system 72 helps to maximize the production rate of the well by reducing the buildup of gas pressure.

The flow control systems discussed herein with reference to FIGS. 1-4 may be used as a standalone product for free-flowing wells, or as part of an artificial lift pumping system. In one embodiment, when such a flow control system is used as an intake system for a pump, the flow control system enhances a pump performance by reducing the flow of gas to the pump.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A flow control system for a horizontal well production system comprising a casing, a tube having an intake opening and disposed within the casing, and a gap formed between the casing and the tube, the flow control system comprising;
   a valve comprising an orifice, coupled to the tube and disposed proximate to the intake opening; and
   an actuator coupled to the valve and configured to open the valve along a radial direction, in response to a presence of a liquid in the gap, proximate to the intake opening, to permit flow of the liquid into the tube via the intake opening, and to close the valve in response to a presence of a gas in the gap, proximate to the intake opening, to prevent flow of the gas into the tube via the intake opening, wherein the valve and the actuator are disposed within the tube, and wherein the tube is a production tube.

2. The flow control system of claim 1, wherein the valve is a poppet valve.

3. The flow control system of claim 1, further comprising:
   a gas sensor disposed proximate to the intake opening; and
   a flow controller coupled to the gas sensor and the actuator; wherein the controller is configured to control the actuator in response to an output from the gas sensor.

4. The flow control system of claim 3, wherein the actuator is configured to close the valve in response to detection of the presence of the gas in the gap, proximate to the intake opening, by the gas sensor, and to open the valve in response to detection of an absence of the gas in the gap, proximate to the intake opening, by the gas sensor.

5. The flow control system of claim 1, wherein the actuator comprises a float and a link, wherein the float is coupled to the tube via the link.

6. The flow control system of claim 1, wherein the orifice comprises a variable orifice configured to control a flow rate of the liquid into the tube via the intake opening.

7. The flow control system of claim 1, wherein the orifice comprises a fixed orifice.

8. A horizontal well production system comprising:
a casing;
a tube having an intake opening and disposed within the casing;
a gap formed between the casing and the tube;
a pump coupled to the tube; and
a flow control system comprising:
a valve comprising an orifice, coupled to the tube and disposed proximate to the intake opening; and
an actuator coupled to the valve and configured to open the valve along a radial direction, in response to presence of a liquid in the gap, proximate to the intake opening, to permit flow of the liquid into the tube via the intake opening and to close the valve in response to the presence of a gas in the gap, proximate to the intake opening, to prevent flow of the gas into the tube via the intake opening, wherein the valve and the actuator are disposed within the tube, and wherein the tube is a production tube.

9. The horizontal well production system of claim 8, wherein the valve is a poppet valve.

10. The horizontal well production system of claim 8, wherein the flow control system further comprises a gas sensor disposed proximate to the intake opening and a flow controller coupled to the gas sensor and the actuator, and wherein the flow controller is configured to control the actuator in response to an output from the gas sensor.

11. The horizontal well production system of claim 10, wherein the actuator is configured to close the valve in response to detection of the presence of the gas in the gap, proximate to the intake opening, by the gas sensor, and to open the valve in response to detection of an absence of the gas in the gap, proximate to the intake opening, by the gas sensor.

12. The horizontal well production system of claim 8, wherein the actuator comprises a float and a link, wherein the float is coupled to the tube via the link.

13. The horizontal well production system of claim 8, wherein the orifice comprises a variable orifice configured to control a flow rate of the liquid into the tube via the intake opening.

14. The horizontal well production system of claim 8, wherein the orifice comprises a fixed orifice.

15. The horizontal well production system of claim 8, wherein the intake opening comprises a plurality of intake openings and the valve comprises a plurality of valves, and each valve is disposed proximate to a corresponding intake opening from the plurality of intake openings.

16. A method for controlling flow in a horizontal well production system, the method comprising:
directing a gas and a liquid via a gap formed between a casing, and a tube disposed within the casing;
opening a valve comprising an orifice, coupled to the tube and disposed proximate to an intake opening formed in the tube, from an interior of the tube via an actuator, along a radial direction in response to the presence of the liquid in the gap, proximate to the intake opening, to permit flow of the liquid into the tube via the intake opening, wherein the valve and the actuator is disposed within the tube, and wherein the tube is a production tube;
directing the flow of the liquid via the tube to a horizontal well surface, using a pump;
closing the valve along the radial direction from the interior of the tube via the actuator in response to a presence of the gas in the gap, proximate to the intake opening, to prevent flow of the gas into the tube via the intake opening; and
directing the flow of the gas via the gap to the horizontal well surface.

17. The method of claim 16, further comprising detecting the presence of the gas in the gap, proximate to the intake opening, via a gas sensor.

18. The method of claim 17, further comprising controlling the actuator vi a flow controller in response to an output from the gas sensor.

19. The method of claim 16, further comprising opening and closing the valve via the actuator comprising a float and a link.

20. The method of claim 16, further comprising controlling a flow rate of the liquid into the tube through the intake opening, wherein the orifice comprises a variable orifice in the valve.

21. The method of claim 16, wherein the orifice comprises a fixed orifice.

* * * * *